US008049537B2

(12) United States Patent
Pagnanelli (10) Patent No.: US 8,049,537 B2
(45) Date of Patent: Nov. 1, 2011

(54) METHOD AND APPARATUS FOR REDUCING TRANSMITTER AC-COUPLING DROOP

(75) Inventor: Chris Pagnanelli, Huntington Beach, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/583,086

(22) Filed: Aug. 12, 2009

(65) Prior Publication Data

US 2010/0073038 A1  Mar. 25, 2010

Related U.S. Application Data

(60) Provisional application No. 61/188,819, filed on Aug. 12, 2008.

(51) Int. Cl.
H03B 1/00  (2006.01)

(52) U.S. Cl. ......... 327/108; 327/110; 327/111; 327/594

(58) Field of Classification Search .................. None
See application file for complete search history.

(56) References Cited

U.S. PATENT DOCUMENTS

| 4,309,665 | A | | 1/1982 | Yamashiro |
| 5,579,202 | A | | 11/1996 | Tolfsen et al. |
| 5,822,426 | A | * | 10/1998 | Rasmus et al. ............... 379/402 |
| 6,661,214 | B1 | | 12/2003 | Hann et al. |
| 6,778,016 | B2 | | 8/2004 | Luo |
| 6,842,075 | B2 | | 1/2005 | Johnson et al. |
| 7,683,718 | B2 | * | 3/2010 | Dishop ........................ 330/276 |
| 7,684,499 | B2 | * | 3/2010 | Schley-May ................. 375/258 |

FOREIGN PATENT DOCUMENTS

| JP | 2002-320252 | 10/2002 |
| JP | 2004-343419 | 2/2004 |
| KR | 10-2008-0039250 | 5/2008 |

OTHER PUBLICATIONS

"Producing a Counter EMF", http://www.tpub.com/neets/book2/5e.htm, 3 pages (date unknown).
"Electric Machinery: Chap. 2 Transformers—Dot Convention to Denote the Polarity of a Transformer",http://pemclab.cn.netu.edu.tw/W3elemac/W3slide/ch2.xformers/sld009.htm, 4 pages (date unknown).
"Transformer Polarity", Copyright 2002 Kilowatt Classroom, I IC, 4 page (date unknown).
"Application Note—Design of H.F. Wideband Power Transformers; Part II—EC07213", Philips Semiconductors, Mar. 23, 1998, pp. 1-10.
"Technical Information—Use of Ferrites in Broadband Transformers", Fair-Rite Products, Corp., 14th Edition, pp. 170-173 (date unknown).
Huiting Chen, et al., "Current Mirror Circuit with Accurate Mirror Gain for Low β Transistors", supported in part by Dallas Semiconductor Corp., 4 pages (date unknown).
G. Palmisano, et al., "Harmonic Distortion on Class *AB* CMOS Current Output Stages", *IEEE Transactions on Circuits and Systems-II: Analog and Digital Signal Processing*, vol. 45, No. 2, Feb. 1998, 243-250.

* cited by examiner

*Primary Examiner* — An Luu (57) ABSTRACT

As part of a transmitter and receiver system a droop compensator is provided between the channel isolation device and the driver system to compensate for reduced transition densities. The droop compensator is configured to improve power transfer to the channel in response to reductions in transition density without affecting power transfer during periods of high transition density. The droop compensator creates an impedance mismatch between the matching circuit and driver in relation to the line impedance. The droop compensator may comprise passive elements, such as capacitors, inductors, or resistor, or active elements including transistors or power control modules. The droop compensator may be configured to operate with transformer line couplers or capacitor line couplers, and either current drivers or voltage drivers.

14 Claims, 6 Drawing Sheets

| Prior Art Performance 808 | Average | Average | Good |
|---|---|---|---|
| Frequency 804 → | Low | Medium | High |
| Droop Compensated Performance 812 | Poor | Good | Good |
| | ~ 0 MHz | ~ 1 MHz | ~ 10 MHz |

METHOD AND APPARATUS FOR REDUCING TRANSMITTER AC-COUPLING DROOP

PRIORITY CLAIM

This application claims the benefit of and priority to U.S. Provisional Patent Application No. 61/188,819 entitled Method and Apparatus for Reducing Transmitter AC-Coupling Droop filed on Aug. 12, 2008.

FIELD OF THE INVENTION

The invention relates to communication systems and in particular to a method and apparatus for transmitter droop compensation in communication systems that employ line/channel interfaces with AC-coupling.

RELATED ART

In wireline electronic communication applications, it is sometimes necessary to isolate sensitive, low-voltage circuitry from high-voltage disturbances that can arise directly from unintended coupling to power mains, due to physical shorts in a wire conduit, or indirectly from lightning surges. Industry standards governing telephony and computer networking (Ethernet) systems commonly refer to this as line isolation. Transformers with isolated primary and secondary windings, and high-voltage capacitors, are commonly used in wireline interface circuits to provide the necessary line isolation. The problem with such circuits is that the AC-coupling introduced by isolated transformers and capacitors can cause unwanted exponential decay of transmit voltage levels, disrupting reliable equipment operation if sufficient waveform transition densities cannot be assured. The term transition density is defined as the number of waveform transitions that occur during a time period in relation to the possible number of waveform transitions which could occur. Low transition densities may result in long periods of constant output voltage, which are considered low frequency because the transition density between high values and low values is low. The proposed method provides a solution to transmitter droop in systems where line isolation is employed. This method does not suffer many of the disadvantages associated with prior art droop reduction methods.

Droop in output or received voltage is generally accepted as undesirable because it reduces the voltage level, which in turn may corrupt decision events of the received signal. For example, in a communication system which quantizes a received signal to either a one value or a zero value based on the received signal's magnitude in relation to ½ volt, transmission of a one value which suffers from droop may be received at a voltage of at or less than ½ volt. This in turn results in a quantization to zero, which is an error.

Several methods for reducing droop in high-voltage, line-isolated transmitters exist as prior art. One such method is to increase waveform transition density. Another solution is to use transformers or capacitors for line isolation coupling that degrade the low-frequency response of the line interface circuit as little as possible. Generally, a combination of methods is employed to achieve the best transmit droop reduction possible.

Methods for reducing droop by increasing transmit waveform transition density include line encoding and data randomization. Line coding techniques such as MLT-3, Alternate Mark Inversion, and Manchester Encoding increase the data transition density of binary transmissions by using memory of past transmit levels to encode future transmit levels in a manner that reduces long sequences of identical levels. Unfortunately, such encoding techniques generally increase the frequency bandwidth needed for data transmission. Data randomizers (scramblers) are commonly implemented by employing linear feedback shift registers to produce maximum length sequences. Scramblers randomize transmitted data such that long sequences of identical transmit levels are less likely, thereby reducing the low frequency content of a transmitted waveform. But use of scramblers can result in bit error rate multiplication at the receiver and may not be suitable in systems that operate at low signal-to-noise ratios.

Techniques that increase the data transition density of a transmit waveform reduce the probability of transmitting long sequences of identical transmit levels, but do not eliminate them. Therefore, to further reduce transmitter droop, these techniques can be used in conjunction with methods that reduce AC-coupling effects, for example by employing isolation transformers with high winding inductance, or high-voltage line isolation capacitors with large capacitance. However, transformers with high winding inductance and high-voltage line isolation capacitors with large capacitance require more printed circuit board area and are expensive to manufacture. Also, these devices may exhibit poor high-frequency response, which is unacceptable in wideband communication systems.

Alternatively, equalizers that emphasize the low frequency response of the transmitted signal can be used to compensate for poor low-frequency response in a line interface circuit. The disadvantage of most equalizers of this type is that high-frequency signals are attenuated unless the voltage or current drive levels of the line driver are increased to account for this high frequency attenuation. Higher drive levels generally require larger devices that consume more power and heat, or devices that introduce unacceptable distortion, or both.

SUMMARY

To overcome the drawbacks of the prior art and provide additional benefits, a system for reducing voltage droop in a communication system is disclosed. In one embodiment, this system comprises a signal source configured to generate a signal. The signal is to be transmitted over a communication channel and a driver is provided and configured to amplify the signal. A line isolation device is provided and configured to isolate the driver from the channel. One or more impedance mismatching devices are provided and configured to offset low frequency impedance mismatches of the driver and the line isolation device, with respect to the channel characteristic impedance.

In one embodiment, the one or more impedance mismatching devices consist of one or more capacitors, inductors, or both. The driver may comprise a voltage driver or a current driver and the signal source may comprise a digital to analog converter associated with a transmitter. In one configuration, the line isolation device comprises a device selected from the group consisting of a transformer and a capacitor. It is contemplated that the offset comprises an offset as to the communication channel impedance. In one embodiment the driver further comprises a resistor or resistance, which is selected to match the driver and resistor combination to the impedance of the channel.

Also disclosed is a driver and line isolation system having droop compensation. This system comprises a driver having an output impedance configured to amplify a signal to a level suitable for transmission over a channel. Part of or in addition to the amplifier is a matching resistor configured to impedance match the matching resistor and the driver output impedance in relation to the channel. A droop compensator is provided and configured to create a mismatch between the matching resistor, the driver output impedance, and the droop compensator in relation to the channel. A line coupler is configured to connect to a channel and to electrically connect to the driver to isolate high voltage transients on the channel from the driver.

The driver may comprise a voltage amplifier or a current amplifier. In one embodiment the driver is configured in differential mode as a voltage amplifier and a matching resistor is in series with the driver output and the droop compensator. The droop compensator may comprise a capacitor and the line coupler may comprise a transformer. In one embodiment the line coupler comprises a transformer and the droop compensator is configured to increase impedance looking into the transmitter from the channel in response to lower transition densities. It is contemplated that the driver may have two outputs and each output has a series connected resistor and capacitor, such that the two capacitors cause an impedance mismatch in relation to the channel.

As part of this innovation, a method is disclosed for reducing voltage droop in response to low transition density. This exemplary method comprises presenting an amplified signal from a driver to a matching resistor for impedance matching such that the matching resistor is configured to impedance match the driver and matching resistor to a channel. This system then droop compensates the amplified signal before or after the impedance matching such that the droop compensating mismatches the impedance as compared to the channel. The system presents the amplified signal, after impedance matching and droop compensation, to a line coupler and presents the output of the line coupler to the channel.

It is contemplated that the line coupler may isolate the driver from high energy transients on the line. In one embodiment, droop compensating comprises creating an impedance mismatch in relation to the channel. The impedance mismatch may offset mid-frequency impedance mismatches of the amplifier and the line coupler, with respect to the channel characteristic impedance. In one embodiment mid-frequency comprises frequencies greater than one megahertz. It is contemplated that when the amplified signal exhibits high transition density the droop compensation does not alter the amplified signal but when the amplified signal exhibits a reduction in transition density, the droop compensation matches the combined impedance of the driver, matching resistor and droop compensator to the combined impedance of the line coupler and the channel.

Other systems, methods, features and advantages of the invention will be or will become apparent to one of ordinary skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks in the prior art a method and apparatus is disclosed herein for reducing transmitter droop in communication systems that employ line/channel interfaces with AC-coupling to provide high-voltage isolation or line-powering.

The common methods for reducing transmitter droop in applications that require high-voltage line isolation, discussed above as prior art, exhibit disadvantages that include bandwidth inefficiency, error multiplication, high manufacturing cost, poor high-frequency response, increased power consumption, and/or increased transmitter distortion. The present invention overcomes these disadvantages by frequency shaping of the input return loss response to improve the low-frequency signal coupling of a line interface circuit itself. Input return loss is determined by the ratio of the magnitude of a signal that enters a line isolation circuit to the magnitude of the signal that is reflected back from the line isolation circuit to the source, rather than being transferred to the load through the line isolation circuit. Return loss is a measure of the effective coupling between the transmitter and the line isolation circuit, or the receiver and the line isolation circuit. This return loss response can be shaped to improve the overall power transfer to the load by improving return loss in frequency bands where considerable transmit power is generated, and intentionally degrading return loss in frequency bands where negligible transmit power is generated. Generally, the intentional return loss degradation, or receive power loss, is limited to a relatively narrow region in the low-frequency portion of the transmission band where good return loss is less important. For example, in Ethernet systems input return loss is not specified in the frequency region below 1 MHz. A high input return loss is preferred in the prior art. Likewise, in the prior art, it is preferred to match the impedance of the line to the transmitter and/or receiver. Matched impedances maximize power transfer.

Figure 1:
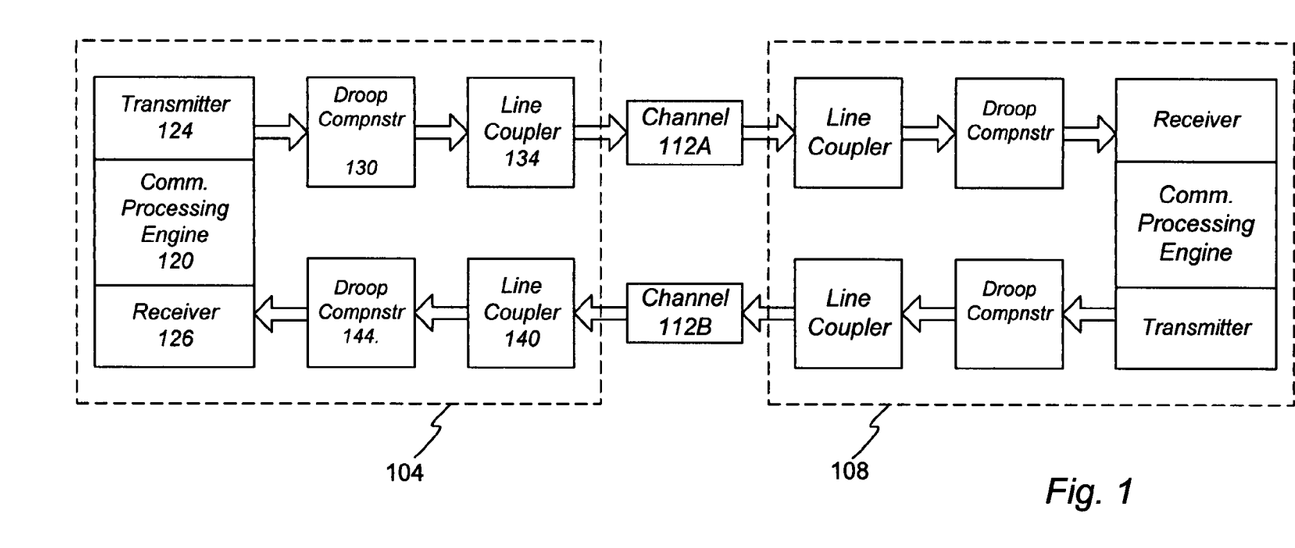
FIG. 1 illustrates an exemplary environment of use of the droop compensation method and apparatus.

FIG. 1 illustrates an exemplary environment for droop compensation. This is but one possible example environment and as such, it is contemplated that one of ordinary skill in the art may arrive at other environments of use. As shown in FIG.

1, a first communication device 104 is in communication with a second communication device 108. The elements within the dashed line representing the devices 104, 108 may be contained on a single communication processing board or card. The communication devices communicate over a channel 112A, 112B, which may comprises a twisted pair copper conductor or any other type channel capable of carrying electrical communication signals. In one embodiment the channels 112A, 112B comprise a single channel capable of duplex operation. Although shown as a channel 112, it is contemplated that multiple channels, such as 4 twisted pair conductors, may be utilized by a single communication device.

In this example environment the communication devices are configured in a generally similar manner and as such, only the first communication device is described. A shown, a transmitter 124 and a receiver 126 are part of or in communication with a communication processing engine 120. The transmitter 124, receiver 126, and communication processing engine 120 operate to receive, transmit and process incoming and outgoing signals as is understood in the art. In one embodiment, the elements 120 124, 126 are configured as a 10 gigabit Ethernet based communication system enabled to operate over twisted pair conductors.

The output of the transmitter 124 provides an outgoing signal to a droop compensator 130, which in turn has an output connected to a line coupler 134. The droop compensator 130 is discussed below in greater detail. The line coupler 134 may comprise any isolation component suitable for isolating the communication device 104 from the channel 112 in response to a high energy or high voltage transient. The second communication device 108 is configured in a similar manner.

With regard to the receive path, the channel 112B connects to a line coupler 140, which isolates the communication device 104 from the channel. The signal from the line coupler 140 is presented to a droop compensator 144, and then to the receiver 126. The second communication device 108 is configured in a similar manner. Operation of the receive path is generally similar to that of the transmit path and hence is not described in great detail. One of ordinary skill in the art, after reading the following disclosure, can apply the transmit path principles to the receive path.

In operation, the transmitter 124 outputs a signal for transmission over the channel 112. The transmitter 124 may include one or more matching resistors which match the impedance of the transmitter to the impedance of the channel 112A. A droop compensator 130 is provided between the transmitter 124 and the line coupler 134 to reduce or eliminate voltage droop resulting from transition of the outgoing signal to a lower frequency. The order of the droop compensator 130 and resistors associated with the transmitter may be reversed. As is generally understood in the art, the transmitter 124 is impedance matched to the channel 112 which in turn achieves maximum power transfer to the channel. In contrast to conventional teaching, the droop compensator 130 creates a mismatch between the combined transmitter 124 and droop compensator 130 as compared to the channel 112. This unconventional mismatch reduces voltage droop. The receive path operates in a similar manner.

Figure 2:
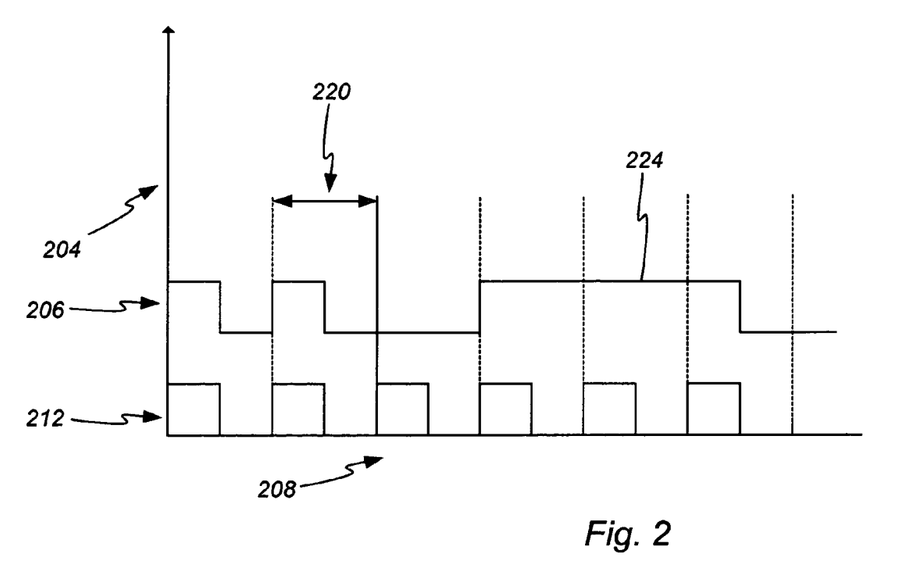
FIG. 2 provides an exemplary plot of signal transitions to aid in the understanding of voltage droop as it relates to communication system operation.

FIG. 2 provides an exemplary plot of signal transitions to aid in the understanding of transition density as it relates to communication system operation. These plots in FIG. 2 are for purposes of understanding and as such, are not to scale, and to not reflect actual timing or frequency relationships. In FIG. 2, the vertical axis 204 represents amplitude while the horizontal axis 208 represents time. A first plot 212 is set with a cycle 220 as shown. For this discussion the frequency of the first plot 212 is defined as the base frequency. At this base frequency droop is avoided.

A second plot 216 is presented above the first plot. It shares a similar cycle 220, but during a period 224, the second signal 206 comprises an extended period of high values. This has the effect of forcing the effective frequency of the second signal 206 during this period 224 to a lower value. As a result, voltage droop may occur because when presented with a lower frequency signal, or DC signal, the line coupler reduces the signal power presented to the channel. This reduction in power presented to the line and the resulting voltage droop reduces the voltage differential between a logical 1 symbol and a logic 0 symbol. Therefore, decoding and slicing errors may be more likely to occur at the receiver.

Figure 3A:
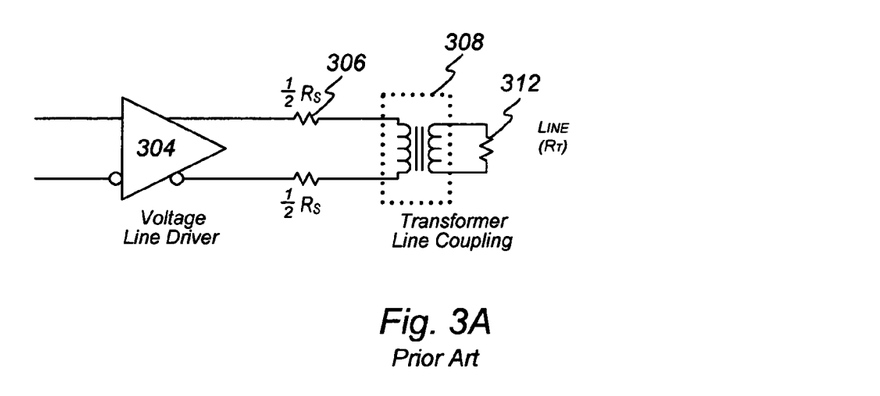
FIG. 3A is an example of a prior art circuit with a voltage driver that employs an isolation transformer for high-voltage line isolation.

FIG. 3A is an example of a prior art circuit that employs an isolated transformer for high-voltage line isolation and a voltage line driver. In this embodiment, a driver 304 generates a drive signal to push a signal onto the channel. The channel characteristic impedance is represented by the line resistance $R_T$ 312. Between the driver 304 and the line resistance 312 is a matching resistance 306 configured as resistors which match the impedance of the driver 304 and resistor 306 to the termination resistor 312. The value resistor $R_S$ is chosen to match the characteristic impedance of the channel or $R_T$. Between the matching resistor $R_S$ and the channel, designated as channel resistance 312 is the line coupler 308. In this embodiment the line coupler 308 is a transformer. As related to FIG. 1, the driver and resistor $R_S$ are part of the transmitter 124 (FIG. 1).

Figure 3B:
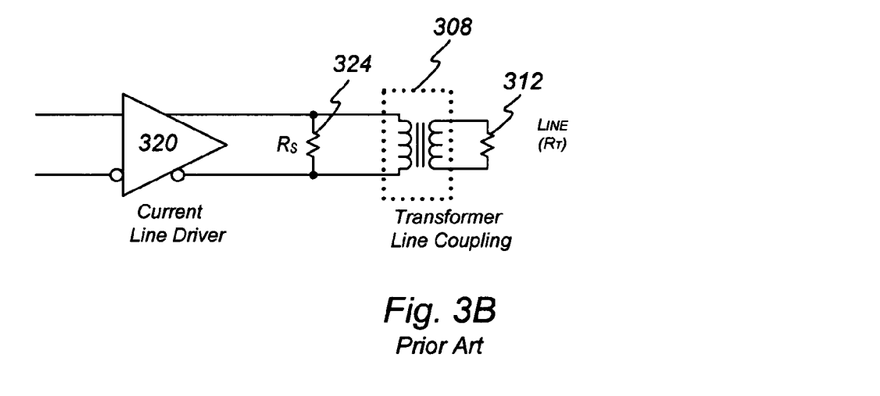
FIG. 3B illustrates a prior art circuit with a current driver that employs an isolation transformer for high-voltage line isolation.

FIG. 3B illustrates a prior art circuit that employs a current line driver. In this embodiment, the differential output of the current driver 320 is presented across a matching resistor $R_S$ 324 and then to the transformer 308. The channel characteristic impedance is represented by resistance $R_T$ 312. Again, the resistor $R_S$ is chosen to match the characteristic impedance of the line $R_T$. The basis for this matching is to achieve maximum power transfer to the line, with characteristic impedance represented by $R_T$.

Figure 4A:
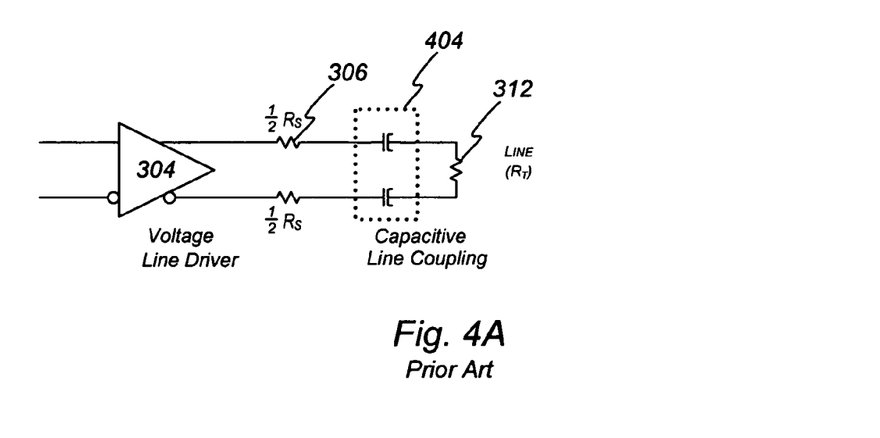
FIGS. 4A and 4B are examples of a prior art circuits similar to FIGS. 5A, 5B that use capacitive coupling for high-voltage line isolation.
Figure 4B:
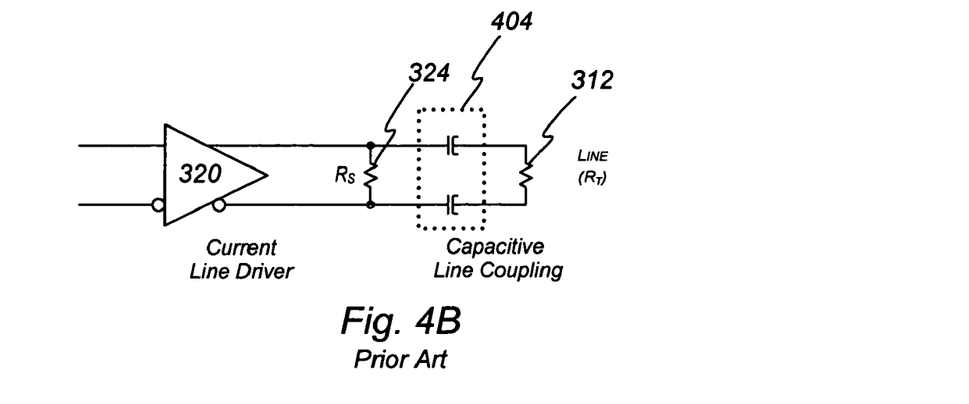

FIGS. 4A and 4B are examples of a prior art circuit that uses capacitive coupling for high-voltage line isolation. The embodiment of FIG. 4A is similar to the system of FIG. 3A and as such, only the elements which differ from FIG. 3A are discussed. In FIG. 4A, the line coupler 404 comprises capacitors, which are an alternate to transformers as shown in FIG. 3A. Likewise, FIG. 4B illustrates the embodiment of FIG. 3B with capacitors 404 serving as the line isolation means.

The prior art circuits of FIGS. 3A, 3B, 4A and 4B have a frequency response of the form:

$$H(j\omega) = \frac{j\omega\tau_1}{1 + j\omega\tau_1},$$

where $\tau_1$ is a time constant that depends on the transformer winding inductance, or line coupling capacitance, and the impedance of the source ($R_S$) and the characteristic impedance of the channel ($R_T$). This frequency response translates, via Laplace transform, to a time response given by:

$$V_{Out} = V_{In} \cdot e^{-t/\tau_1}.$$

The above equation shows that if the transmit voltage ($V_{In}$) is constant for a long period of time (t), the output voltage at the line ($V_{Out}$) will decay, producing unwanted droop.

Figure 5A:
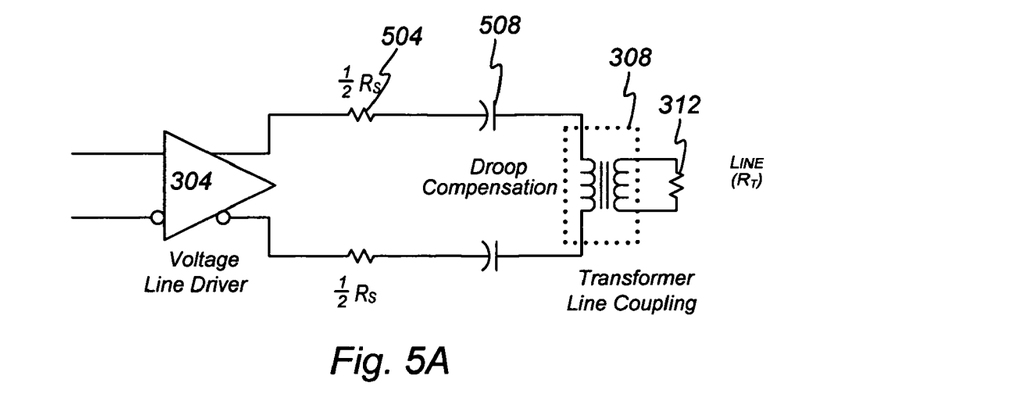
FIG. 5A illustrates the voltage driver in connection with a droop compensator in connection with a transformer.
Figure 5B:
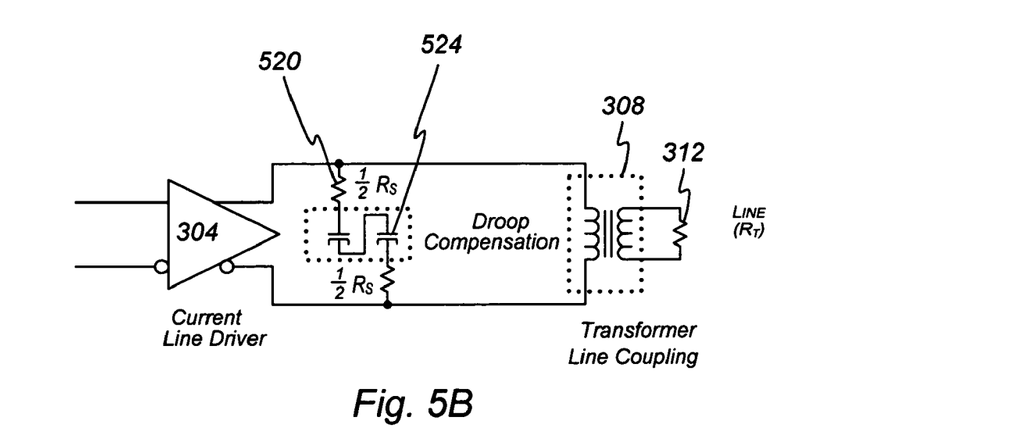
FIG. 5B illustrates a current driver in connection with a droop compensator in connection with a transformer.

To overcome these drawbacks, FIGS. 5A and 5B show an example circuit implementing the method and apparatus disclosed herein. Although this example method is shown for transformer line coupling, the same method is effective for capacitive line coupling as well, which is discussed below in connection with FIGS. 6A and 6B. FIGS. 5A, 5B show the system implemented in a balanced configuration, but unbalanced configurations are also realizable to reduce component count.

As shown in FIG. 5A, the voltage driver 304 presents the outgoing signal in differential format to the matching resistors $R_S$ 504 which are matched to the line 312 just as in the prior art. However, the output of the resistor(s) $R_S$ 504 connect to the droop compensators, which in this embodiment comprise capacitors 508. The outputs of the capacitors 508 connect to the transformer 308, which isolates the driver 304 from the line 312 represented by $R_T$. The addition of the capacitors 508 creates a mismatch between the line 312 and the combination of the driver 304 and resistor 504.

FIG. 5B is similar to FIG. 5A, but in FIG. 5B, a current line driver 320 is presented. As such, the droop compensators 524 (capacitors) are in series with the matching resistance $R_S$ 520 as shown. The remainder of the circuit is generally similar to that described in connection with FIG. 5A. The capacitors 524 create an impedance mismatch as compared to the line characteristic impedance $R_T$ 312, which is matched to $R_S$.

Figure 6A:
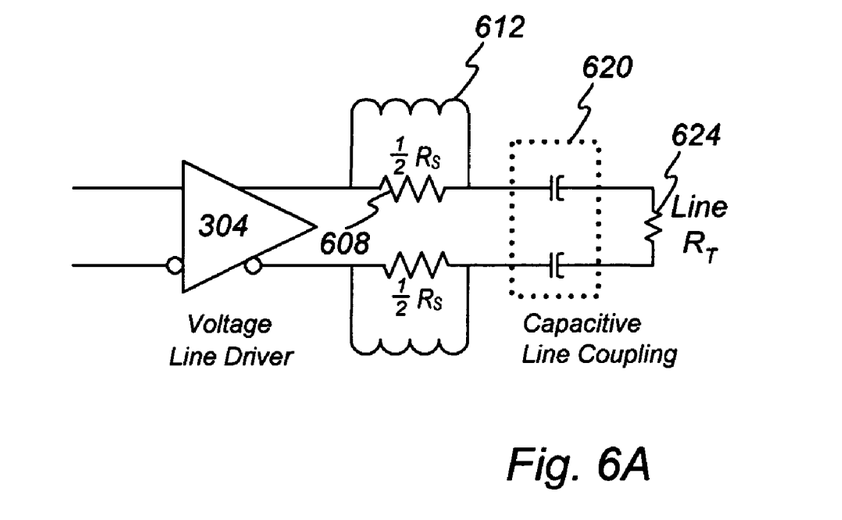
FIG. 6A illustrates an example embodiment of a droop compensator with a capacitive line coupler and a voltage line driver.

FIG. 6A illustrates an example embodiment of a droop compensator with a capacitive line coupler and a voltage line driver. In this embodiment, the voltage line driver 304 connects to matching resistors $R_S$ 608 which are selected to match the impedance of the driver to the line characteristic impedance $R_T$ 624. Between the resistors $R_S$ and the line 624 is a line coupler 620. A droop compensator 612 is provided in parallel across the resistor $R_S$ 608. The droop compensator 612 creates a mismatch as compared to the line resistance 624.

Figure 6B:
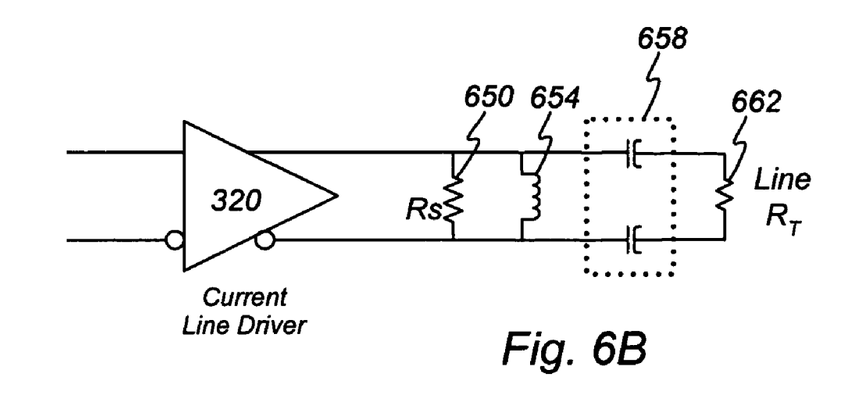
FIG. 6B illustrates an example embodiment of a droop compensator with a capacitive line coupler and a current line driver.

The system of FIG. 6B is similar to the system of FIG. 6A. In FIG. 6B, the driver 320 comprises a current driver. The output of the current driver 320 is presented to opposing sides of a resistor $R_S$ 650 and a droop compensator 654. The parallel connected resistor $R_S$ 650 and droop compensator 654 connect to the line coupler 658, which in turn connects to the channel, represented by resistor $R_T$ 662.

The circuits of FIGS. 5A and 5B have a frequency response of the form:

$$H(j\omega) = \frac{j\omega CR_S + 1}{j\omega C(R_T + R_S) + 1} \cdot \frac{j\omega \tau_1}{1 + j\omega \tau_1}.$$

In general, by establishing capacitors and inductors in parallel or in series with the output of the transmitter or receiver, or both, a frequency-dependent impedance mismatch is created between the transmitter output and the line isolation device. This impedance mismatch goes against traditional teaching in the prior art which teaches that impedances should be matched. By creating an impedance mismatch, the return loss in some frequency bands is improved at the expense of degraded return loss at very low frequencies, such that droop is improved. The addition of the capacitors and inductors as shown does not significantly reduce the high frequency power level transferred to the channel. As a result, the overall net effect is beneficial, although at very low frequencies, such as below 1 megahertz the return loss is decreased, i.e. worsened. However, because Ethernet communication systems produce transmit power with little frequency content below 1 megahertz, the Ethernet standards are not likely to address return loss below 1 megahertz, since the worsening in return loss in that frequency range is not detrimental. In one embodiment, the method and apparatus disclosed herein boosts or at least does not attenuate the low frequency signals above 1 megahertz, without affecting high frequency signals, which in turn has a net effect of increasing overall power transfer to the channel.

In terms of frequency response, with respect to high frequency signals, the termination appears as a well-matched termination. The additional elements and the isolation transformer appear as shorts to high frequency signals and hence do not affect operation. At lower frequencies such as mid frequencies, the isolation transformer behaves in a manner which creates a mismatched interface and contributes to droop. By adding in the capacitors and/or inductors as shown in FIGS. 5 and 6, an impedance is introduced to mismatch the termination impedance in a manner that compensates for the impedance mismatch introduced by the line isolation transformer at medium frequencies. Thus, at medium operational frequencies the power transfer increases, the return loss increases, and the droop decreases. At very low frequencies, such as in one embodiment below 1 megahertz, the addition of the capacitors and/or inductors as shown, creates mismatch in impedance and decreases return loss, but the likelihood of such a long period of constant voltage output represented by these very low frequencies is unlikely and hence acceptable.

The proper values for the capacitors and/or inductors, which serve as the droop compensation, can be determined by one of ordinary skill in the art to adjust the impedance to match the particular line isolation transformer and to adjust the existing frequency response to the bandwidth being utilized. Values may be derived from laboratory testing or through simulation.

Figure 7:
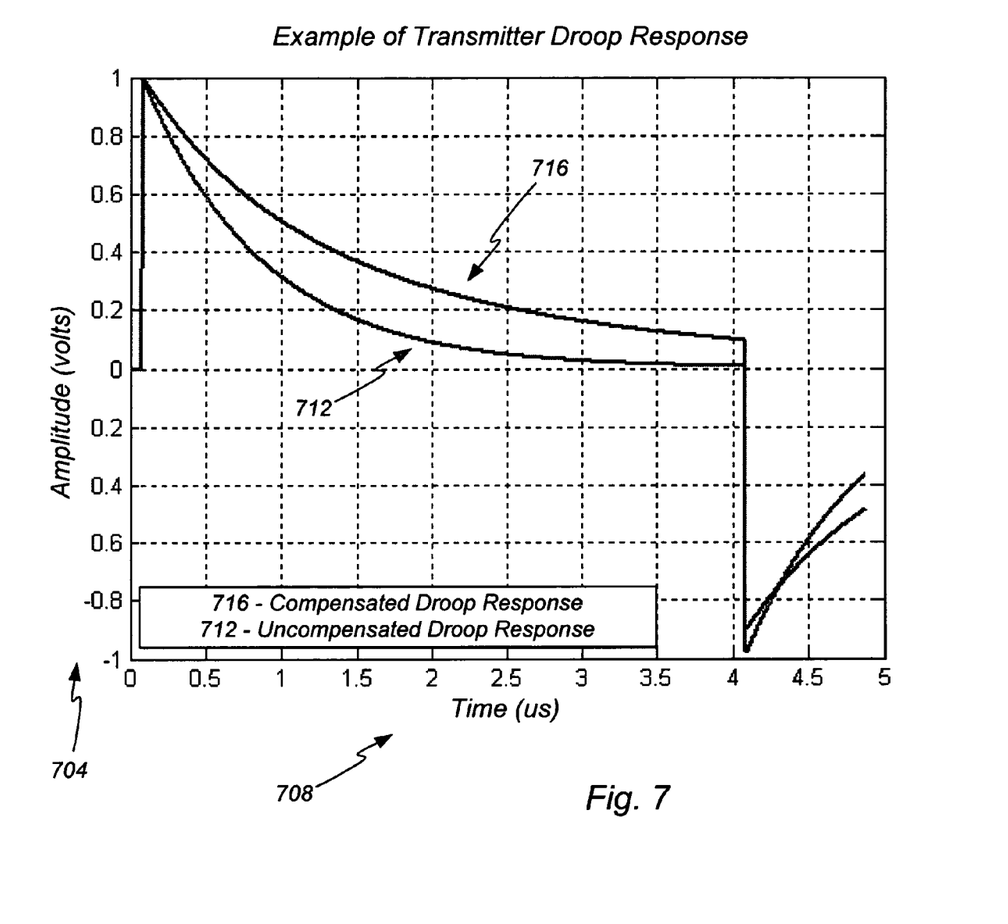
FIG. 7 illustrates exemplary plots of droop associated with an incoming or outgoing signal in a communication system using a prior art embodiment and the solution of the present application.

FIG. 7 illustrates exemplary plots of droop associated with an incoming or outgoing signal in a communication system using a prior art embodiment and the solution of the present application. In these plots the vertical axis 704 represents amplitude while the horizontal axis 708 represents time. Time in microseconds may be correlated to frequency. These plots show the transmitter droop introduced by the line transformer, either on the transmit or receive path. The prior art embodiment is shown by plot 712 while the plot 716 is associated with the method and apparatus disclosed herein utilizing droop compensation. As can be seen, over time the voltage output to the line by the prior art solution 712, drops to a lower voltage level. This occurs because if an output voltage stays constant for a long enough period, such as by transmission of the same voltage level, the signal appears as a low frequency or DC signal. The output to the line may remain constant like this if the transition density decreases. The line coupling (isolation) elements, whether capacitors or transforms, do not pass DC, which in turn causes the voltage of the signal to drop.

In contrast, the upper plot 716, resulting from the system disclosed herein, does not suffer from as significant droop over time. By adding the droop compensation, the impedance of the driver and droop compensation is tuned to pass the drive signal when the effective frequency of the drive signal drops from a reduction in transition density. The benefit of reducing transmitter droop is that a higher magnitude signal is presented to the line, which in turn results in a high magnitude signal being received by the opposing receiver. The received signal is thus better able to be accurately decoded and processed by a decision device, which minimizes errors.

As compared to the previously discussed methods, the present innovation reduces transmitter droop as seen by the channel in line-isolated transmitter applications. Likewise, power presented to a receiver is improved when the receiver includes droop compensation as disclosed herein. Although input return loss is degraded at non-operational frequencies, the net droop across the frequency band of interest decreases. Thus, there is an overall net gain.

Figure 8:
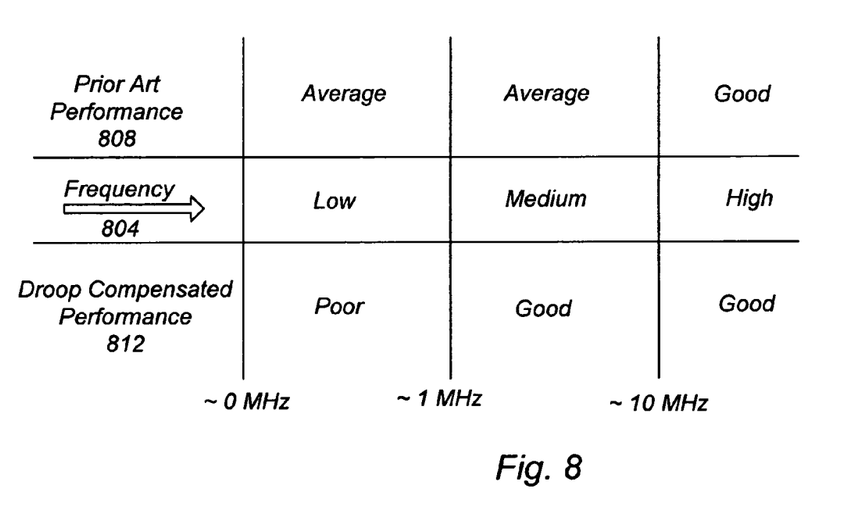
FIG. 8 illustrates a generalized performance chart for the droop compensation system in relation to the prior art.

FIG. 8 illustrates a generalized performance chart for the droop compensation system in relation to the prior art. As disclosed above, the droop compensation mismatches the historically preferred and desired impedance match between the driver and resistor $R_S$, in relation to the channel. In FIG. 8, the frequency range 804 is generally divided into three bands, namely low, medium and high. In one embodiment, these bands may be defined as the ranges between zero and 1 megahertz, 1 megahertz to 10 megahertz, and above 10 megahertz. In the prior art 808, performance as it related to power transfer to the channel was defined for each frequency band as shown in the table. Performance was average in the low and medium frequency bands and good in the high frequency band.

In contrast, the droop compensated system performance suffers from poor performance in the low frequency range, which would be considered undesirable, but achieves good performance in the medium and high frequency bands. This overall performance, although worse in the low frequency range, achieves better performance in actual implementation, particularly when presented with lower transition densities that force the otherwise high frequency signal into the medium frequency range. This is achieved by taking a non-traditional approach of mismatching the impedance.

The method and system disclosed also has the advantages of reducing droop without attenuating high frequency transmit signal components. Thus, this method does not require increased transmitter drive levels, which would undesirably increase power consumption and cross-line crosstalk. In addition, this method does not introduce transmitter distortion which might otherwise increase the bit error rate or reduce throughput.

This method does not require line-coupling transformers with high winding inductance, which as discussed above, increase cost, size requirements, and may harm high frequency performance through introduction of unwanted parasitic effects. For example, transformers with ferrite cores optimized for low frequency, may perform poorly at high frequency. Likewise, this method does not require line-coupling capacitors with high capacitance. This method also overcomes the drawback in the prior art which may cause bit error rate multiplication at the receiver due to certain scrambler implementations. Moreover, this method does not reduce bandwidth or impair high-frequency response, and this method is also compatible with simultaneous use of other droop mitigation techniques such as equalizing filters, data scramblers, and line encoders.

It is contemplated that this method and apparatus is well suited for Ethernet applications. In one embodiment, this system for droop reduction is utilized in a 100 megabit Ethernet communication system operating over twisted pair conductors. It is also contemplated that such a communication system may be configured for operation at various different communication rates from 100 megabit to 10 gigabit. Although 100 megabit rate systems would have longer durations of constant voltage level (more very low frequency content) which may suffer from droop and from decrease return loss, the slicer or quantization precision is not a high as in 10 gigabit systems, which provides cushion and maintains desired operation. In addition, the method and apparatus disclosed herein may be applied at the transmitter, the receiver, or both.

Other systems, methods, features and advantages of the invention will be or will become apparent to one of ordinary skill in the art upon examination of the following figures and detailed description. It is intended that all such additional systems, methods, features and advantages be included within this description, be within the scope of the invention, and be protected by the accompanying claims. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system for reducing voltage droop in a communication system, the system comprising:
   a signal source configured to generate a signal, the signal to be transmitted over a communication channel having a characteristic impedance;
   a voltage driver configured to i) amplify the signal and ii) output the signal on a first signal line and a second signal line;
   a line isolation device configure to isolate the voltage driver from the channel;
   a matching resistance configured to match the characteristic impedance, the matching resistance including
      a first resistor connected in series with the first signal line between i) the voltage driver and ii) the line isolation device, and
      a second resistor connected in parallel to the first resistor and in series with the second signal line between i) the voltage driver and ii) the line isolation device; and
   a voltage droop compensator configured to offset low frequency impedance mismatches of the voltage driver and the line isolation device with respect to the characteristic impedance, wherein the voltage droop compensator includes at least one of
      i) a first capacitor connected in series between the first resistor and the line isolation device and, and a second capacitor connected in series between the second resistor and the line isolation device, and
      ii) a first inductor connected in parallel with the first resistor and a second inductor connected in parallel with the second resistor.

2. The system of claim 1, wherein the line isolation device comprises a transformer and the voltage droop compensator is configured to increase impedance looking into the signal source from the communication channel in response to lower transition densities.

3. The system of claim 1, wherein the signal source comprises a digital to analog converter associated with a transmitter.

4. The system of claim 1, wherein the line isolation device comprises i) a transformer when the voltage droop compensator includes the first capacitor and the second capacitor, and ii) a capacitive line coupling when the voltage droop compensator includes the first inductor and the second inductor.

5. The system of claim 1, wherein the offset comprises an offset as to the characteristic impedance.

6. A system for reducing voltage droop in a communication system, the system comprising:
   a signal source configured to generate a signal, the signal to be transmitted over a communication channel having a characteristic impedance;
   a current driver configured to i) amplify the signal and ii) output the signal on a first signal line and a second signal line;

a line isolation device configure to isolate the current driver from the channel;

a matching resistance configured to match the characteristic impedance, the matching resistance including a first resistor connected i) between the first signal line and the second signal line, and ii) between the current driver and the line isolation device; and a voltage droop compensator configured to offset low frequency impedance mismatches of the current driver and the line isolation device with respect to the characteristic impedance, wherein the voltage droop compensator includes an inductor connected i) in parallel to the first resistor, ii) between the first signal line and the second signal line, and iii) between the first resistor and the line isolation device.

7. The system of claim 6, wherein the signal source comprises a digital to analog converter associated with a transmitter.

8. The system of claim 6, wherein the line isolation device comprises a capacitive line coupling.

9. The system of claim 6, wherein the offset comprises an offset as to the characteristic impedance.

10. A system for reducing voltage droop in a communication system, the system comprising:

a signal source configured to generate a signal, the signal to be transmitted over a communication channel having a characteristic impedance;

a current driver configured to i) amplify the signal and ii) output the signal on a first signal line and a second signal line;

a line isolation device configure to isolate the current driver from the channel;

a matching resistance configured to match the characteristic impedance, the matching resistance including a first resistor connected i) between the first signal line and the second signal line, and ii) between the current driver and the line isolation device, and a second resistor connected in series with the first resistor between the first signal line and the second signal line; and a voltage droop compensator configured to offset low frequency impedance mismatches of the current driver and the line isolation device with respect to the characteristic impedance, wherein the voltage droop compensator includes i) a first capacitor connected in series with the first resistor and the second resistor and ii) a second capacitor connected in series with the first capacitor, the first resistor, and the second resistor.

11. The system of claim 10, wherein the signal source comprises a digital to analog converter associated with a transmitter.

12. The system of claim 10, wherein the line isolation device comprises a transformer.

13. The system of claim 10, wherein the offset comprises an offset as to the characteristic impedance.

14. The system of claim 10, wherein the line isolation device comprises a transformer and the voltage droop compensator is configured to increase impedance looking into the signal source from the communication channel in response to lower transition densities.

\* \* \* \* \*